Figure 1:
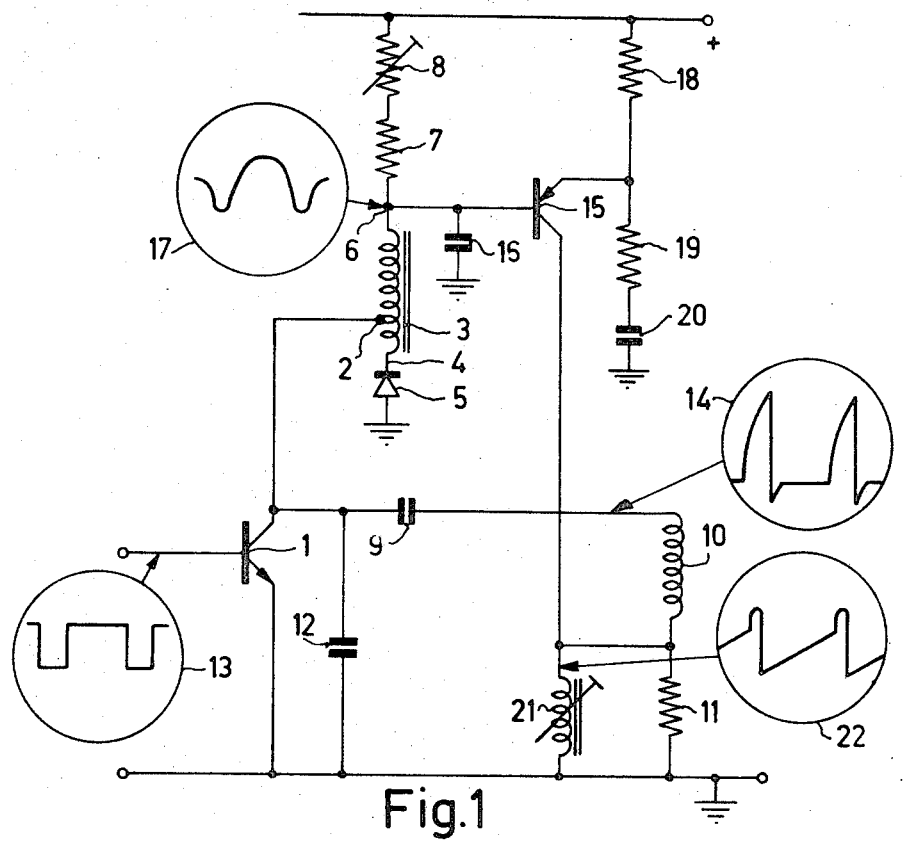

United States Patent [19]

Rogowski

[11] 3,728,579
[45] Apr. 17, 1973

[54] LINE SCANNING CIRCUIT ARRANGEMENTS HAVING LINEARIZING MEANS

[75] Inventor: Stanislaw Rogowski, Cambridge, England

[73] Assignee: Pye Limited, London, England

[22] Filed: Nov. 4, 1971

[21] Appl. No.: 195,700

[30] Foreign Application Priority Data

Nov. 11, 1970  Great Britain......................53,643/70

[52] U.S. Cl. ................315/27 TD, 307/228, 328/184
[51] Int. Cl..........................H01j 29/70, H03k 4/08
[58] Field of Search.............................307/228, 270; 328/184; 315/27 TD

[56] References Cited

UNITED STATES PATENTS

| | | | |
|---|---|---|---|
| 3,247,419 | 4/1966 | Attwood | 307/228 X |
| 3,098,171 | 7/1963 | Ashley | 315/27 TD |
| 3,185,888 | 5/1965 | Schneider | 315/27 TD |
| 3,439,221 | 4/1969 | Drummond | 315/27 TD |

*Primary Examiner*—Stanley D. Miller, Jr.
*Attorney*—Frank R. Trifari

[57] ABSTRACT

A line scanning circuit having its output circuit a-c coupled to a scanning coil employs linearizing means comprising a transistor to generate a parabolic waveform that is injected into the bottom of the scanning coil while the conventional sawtooth waveform is supplied to the top of the scanning coil.

7 Claims, 2 Drawing Figures

PATENTED APR 17 1973     3,728,579

INVENTOR.
STANISLAV POGOWSKI
BY
[signature]
AGENT

LINE SCANNING CIRCUIT ARRANGEMENTS HAVING LINEARIZING MEANS

In an ideal line scan system in which the impedance of the scan coils is purely inductive, the application of a square wave function across the scan coils would result in a linear rise of current in them, and consequently in a linear deflection of the electron beam across a camera tube target.

All practical scan coils possess resistance in addition to inductance. Consequently the application of a square wave causes a substantially exponential rise of current in the coils, with corresponding non-linearity of the scan.

It is known to improve linearity by injecting into the scan coils an additional waveform of substantially sawtooth shape. It has been proposed for this purpose to employ an additional transformer, a saturable reactor or a high-Q inductor in series with the scan coil. These methods all suffer from one or more disadvantages, for example, they require additional scan power, they are expensive in material and they are bulky. The additional bulk of the linearizing components themselves and of the enlarged scan driving circuits is particularly disadvantageous in miniature cameras such as are employed in closed circuit television systems for the inspection of inaccessible locations such as the interiors of piping systems.

An object of the present invention is to provide linearizing means requiring less drive power and occupying less physical space than arrangements previously proposed.

The present invention provides a line scanning circuit arrangement of the type in which the scanning coils are a.c. coupled to an output stage, which stage is also provided with a load of a substantially inductive nature, the circuit arrangement being provided with linearizing means comprising a transistor having its base connected to a point on the load and its emitter having a substantially resistive impedance, a capacitor being connected between the base and a point of reference potential, an inductor being connected between the collector of the transistor and the point of reference potential, the inductor being additionally connected in parallel with a resistor provided between the end of the scanning coils remote from their connection to the output stage and the point of reference potential.

The load for the output stage may comprise an autotransformer serially connected to a first resistor, the point on the load to which the base of the transistor is connected being the junction between the transformer and the resistor. The autotransformer may be connected in series with a variable resistor.

The inductor is a variable inductor and the point of reference potential may be at earth or ground potential. When the point of reference potential is at earth potential the substantially resistive impedance for the emitter may comprise first and second resistors and a capacitor serially connected between a supply terminal and earth, the emitter being connected to the junction of the first and second resistors.

Figure 2:
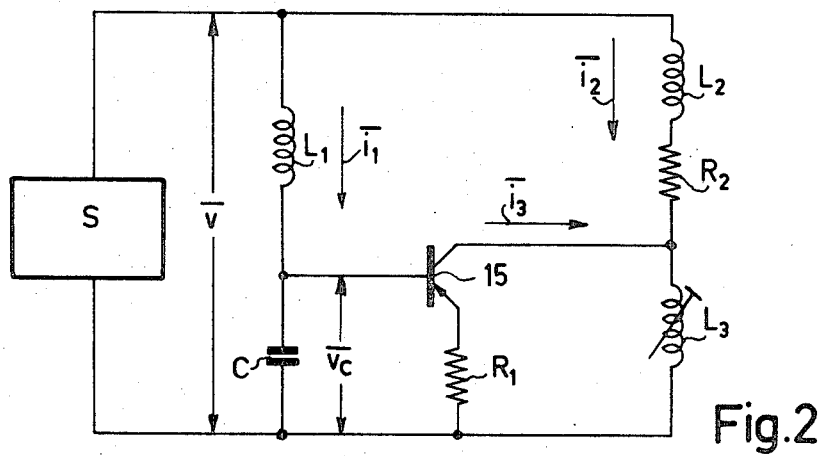

In order that the invention and the manner in which it is to be performed may be more clearly understood, an embodiment will be described by way of example, with reference to the attached drawings, of which:

FIG. 1 is a detail schematic diagram of a scanning system embodying the invention; and FIG. 2 is an equivalent schematic diagram of the arrangement of FIG. 1.

Referring to FIG. 1, a scan output npn transistor 1 has its emitter connected to ground and its collector to a tap 2 on an autotransformer 3. One end of the winding of transformer 3 is connected to ground via diode 5, the other end 6 being connected to a positive supply via resistors 7 and 8 in series.

Also connected to the collector of transistor 1 via d.c. blocking capacitor 9 is one end of scan coil 10, the other end of scan coil 10 being connected to ground via a resistor 11. A capacitor 12 is connected between the collector of transistor 1 and ground.

Thus far the circuit accords with previous practice for a line scan output stage except that resistor 11 is connected between the end of scan coil 10 and earth instead of the scan coil being connected directly to earth.

At each negative-going edge of a line driving square waveform, shown at 13, applied to the base of transistor 1, the latter is cut off. Resonance in the circuit comprising scan coil 10 and capacitor 12 produces the well-known waveform shown at 14 across the scan coil. This waveform rises according to a cosine law as determined by the inductance of scan coil 10 and the parallel capacitance 12. Waveform 14 in itself will produce an exponential change of current in scan coil 10.

The amplitude of waveform 14, and hence the amplitude of scan, is controlled by varying the current passed by transistor 1 by means of resistor 8 which is made variable. Resistor 7 serves to limit the maximum value of current in transistor 1.

In order to produce a linearizing waveform, the base of a pnp transistor 15 is connected to the junction 6 of autotransformer 3 with resistor 7. A capacitor 16 is connected between junction 6 and earth. In the absence of capacitor 16, the waveform appearing at junction 6 will be substantially a sawtooth, produced by the high inductance of autotransformer 3 causing integration of waveform 14. Capacitor 16 further integrates this sawtooth to produce the substantially parabolic waveform shown at 17.

The emitter of transistor 15 is connected to the positive supply via a resistor 18 and to ground via resistor 19 and decoupling capacitor 20. The a.c. impedance in the emitter circuit of transistor 15 is largely determined by resistor 19 which is in general smaller than resistor 18.

A variable inductor 21 is connected between the collector of transistor 15 and ground, and a connection is also made between the collector and the junction of scan coil 10 and resistor 11. The waveform appearing across inductor 21 is as shown at 22. It will be seen that this waveform includes a linearly-rising or sawtooth portion during the scan period. Since waveform 22 appears across resistor 11, it is injected into scan coil 10. The amplitude of waveform 22 is controllable by varying inductor 21, which is adjusted to produce optimum linearity of the scan.

That the effect of the internal resistance of scan coil 10 may be counteracted in this manner may also be seen from the following analysis, made with reference to FIG. 2.

If it is assumed that the impedance of capacitor 16 is smaller than the impedance of resistors 7 and 8 in parallel with the input impedance of transistor 15, the circuit of FIG. 1 may be represented by the equivalent circuit of FIG. 2, in which L1 represents the inductance of transformer 3, L2 the inductance of scan coil 10, L3 the inductance of coil 21, R1 the a.c. emitter load of transistor 15 and R2 the resistance of scan coil 10. The signal from the output stage, i.e. the signal at the collector of transistor 1 is represented by $\bar{v}$. The value of capacitor 16 is denoted by C.

Now the collector current $\bar{i}_3$ of transistor 15 is given by $$\bar{i}_3 = \bar{v}_c K \qquad (1)$$

where $K = yfe/1+yfeR_2$ and $y_{fe}$ is the transfer admittance of transistor 15 but $\bar{v}_c = +j\,\bar{i}_{1/wC}$ $$\therefore \bar{i}_3 = +j\,\bar{i}_{1/wC}\,K \qquad (2)$$

The output voltage $\bar{v}$ is given by $$\bar{v} = \bar{i}_2 jw\,(L_2+L_3) + \bar{i}_2 R_3 + \bar{i}_3 jw\,L_3 \qquad (3)$$

From (2) and (3)

$$\bar{v} = \bar{i}_2 jw\,(L_2+L_3) + \bar{i}_2 R_2 - \bar{i}_1 KL_{3/C} \qquad (4)$$

Cancellation of the effect of $R_2$ will occur when $$\bar{i}_2 R_2 = \bar{i}_1\,(KL_3/C) \qquad (5)$$

and $$\bar{v} = \bar{i}_2 jw\,(L_2+L_3)\ \text{and}\ \bar{i}_2 = \bar{v}/jw\,(L_2+L_3) \qquad (6)$$

Now $$\bar{i}_1 = \bar{v}/j(wL_1 - 1/WC) = \bar{v}/jwL_1\ \text{when}\ wL_1 \gg 1/wC \qquad (7)$$

Then from (5) (6) and (7)

$$R_2/L_2+L_3 = KL_3/CL_1$$

This condition can always be satisfied by adjustment of $L_3$
If $L_2 \gg L_3$ then $$L_3 = CR_2L_1/KL_2$$

A typical practical value for $L_3$ is 160 microhenries. Inductor 21 may therefore be physically small and readily accommodated.

It will also be seen that none of the power provided by transistor 1 is dissipated in the linearizing components such as the saturable inductor previously employed. In fact some part of the scanning power is provided by transistor 15, and the output stage power requirements are correspondingly reduced.

I claim:

1. A linearizing circuit for a line scanning system having an output circuit a-c coupled to scanning coils provided with a substantially inductive load, comprising a transistor having its base connected to a point on said load and its emitter having a substantially resistive impedance, a capacitor connected between said base and a point of reference potential, and an inductor connected between the collector of said transistor and said point of reference potential, one end of said scanning coils being connected to said point of reference potential through said inductor.

2. A circuit as claimed in claim 1, wherein the substantially inductive load comprises an autotransformer, and a first resistor connected in series with said autotransformer, the point on said load to which the base of said transistor is connected being the junction between said transformer and said resistor.

3. A circuit as claimed in claim 2, further comprising a variable resistor, said autotransformer being connected in series with said variable resistor.

4. A circuit as claimed in claim 1, wherein said inductor is a variable inductor.

5. A circuit as claimed in claim 1, wherein said point of reference potential is at earth or ground potential.

6. A circuit as claimed in claim 5, wherein the substantially resistance impedance for the said emitter comprises first and second resistors and a capacitor connected in series between a supply terminal and earth, said emitter being connected to the junction of said first and second resistors.

7. A circuit as claimed in claim 1, further comprising a resistor in parallel with said inductor.

* * * * *